(12) United States Patent
Minami et al.

(10) Patent No.: US 7,957,379 B2
(45) Date of Patent: Jun. 7, 2011

(54) SYSTEM AND METHOD FOR PROCESSING RX PACKETS IN HIGH SPEED NETWORK APPLICATIONS USING AN RX FIFO BUFFER

(75) Inventors: John Shigeto Minami, Honolulu, HI (US); Robia Y. Uyeshiro, Kailua, HI (US); Thien E. Ooi, Honolulu, HI (US); Michael Ward Johnson, Petaluma, CA (US); Mrudula Kanuri, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1391 days.

(21) Appl. No.: 10/969,376

(22) Filed: Oct. 19, 2004

(65) Prior Publication Data

US 2006/0083246 A1  Apr. 20, 2006

(51) Int. Cl.
*H04L 12/28* (2006.01)
(52) U.S. Cl. ........................ 370/392; 370/401
(58) Field of Classification Search .................. None
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 5,012,489 A | 4/1991 | Burton et al. | 375/8 |
| 5,056,058 A | 10/1991 | Hirata et al. | 364/900 |
| 5,161,193 A | 11/1992 | Lampson et al. | 380/49 |
| 5,163,131 A | 11/1992 | Row et al. | 395/200 |
| 5,303,344 A | 4/1994 | Yokoyama et al. | 395/200 |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |
| 5,455,599 A | 10/1995 | Cabral et al. | 345/133 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |

(Continued)

FOREIGN PATENT DOCUMENTS

AU    4595297    5/1998

(Continued)

OTHER PUBLICATIONS

Chesson, Greg, "The Protocol Engine Project" Technology Focus Sep. 1987.

(Continued)

*Primary Examiner* — Hassan Phillips
*Assistant Examiner* — Eunsook Choi
(74) *Attorney, Agent, or Firm* — Zilka-Kotab, PC

(57) ABSTRACT

A system and method are provided for processing packets received via a network. In use, data packets and control packets are received via a network. Further, the data packets are processed in parallel with the control packets.

43 Claims, 8 Drawing Sheets

U.S. PATENT DOCUMENTS

| | | | |
|---|---|---|---|
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 R |
| 5,678,060 A | 10/1997 | Yokoyama et al. | |
| 5,680,605 A | 10/1997 | Torres | 395/603 |
| 5,687,314 A | 11/1997 | Osman et al. | 395/200.01 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,726,769 A | 3/1998 | Imai et al. | 358/442 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,761,281 A | 6/1998 | Baum et al. | 379/93.29 |
| 5,778,178 A | 7/1998 | Arunachalam | 395/200.33 |
| 5,790,400 A | 8/1998 | Dobbins et al. | 370/400 |
| 5,790,676 A | 8/1998 | Ganesan et al. | 380/23 |
| 5,802,278 A | 9/1998 | Isfeld et al. | 395/200.02 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,847,698 A | 12/1998 | Reavey et al. | 345/173 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,901,287 A | 5/1999 | Bull et al. | 709/218 |
| 5,905,582 A | 5/1999 | Hirai et al. | 358/468 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,987,582 A | 11/1999 | Devic | 711/206 |
| 5,991,299 A | 11/1999 | Radogna et al. | 370/392 |
| 5,999,974 A | 12/1999 | Ratcliff et al. | 709/224 |
| 6,012,961 A | 1/2000 | Sharpe et al. | 446/298 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,058,421 A | 5/2000 | Fijolek et al. | 709/225 |
| 6,061,368 A | 5/2000 | Hitzelberger | 370/537 |
| 6,061,742 A | 5/2000 | Stewart et al. | 709/230 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,094,657 A | 7/2000 | Hailpern et al. | 707/103 R |
| 6,098,188 A | 8/2000 | Kalmanek, Jr. et al. | 714/746 |
| 6,101,543 A | 8/2000 | Alden et al. | 709/229 |
| 6,151,625 A | 11/2000 | Swales et al. | 709/218 |
| 6,157,955 A | 12/2000 | Narad et al. | 709/228 |
| 6,157,956 A | 12/2000 | Jensen et al. | 709/246 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden et al. | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher et al. | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher et al. | 709/238 |
| 6,247,068 B1 | 6/2001 | Kyle | 709/328 |
| 6,327,625 B1 | 12/2001 | Wang et al. | 709/235 |
| 6,330,659 B1 | 12/2001 | Poff et al. | 712/34 |
| 6,331,865 B1 | 12/2001 | Sachs et al. | 715/776 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,363,418 B1 | 3/2002 | Conboy et al. | 709/218 |
| 6,377,570 B1 | 4/2002 | Vaziri et al. | 370/352 |
| 6,389,479 B1 | 5/2002 | Boucher et al. | 709/243 |
| 6,389,537 B1 | 5/2002 | Davis et al. | 713/187 |
| 6,393,487 B2 | 5/2002 | Boucher et al. | 709/238 |
| 6,397,316 B2 | 5/2002 | Fesas, Jr. | 711/200 |
| 6,427,169 B1 | 7/2002 | Elzur | 709/224 |
| 6,430,628 B1 | 8/2002 | Conner | 710/5 |
| 6,434,620 B1 | 8/2002 | Boucher et al. | 709/230 |
| 6,460,080 B1 | 10/2002 | Shah et al. | 709/224 |
| 6,480,852 B1 | 11/2002 | Himmel et al. | 707/10 |
| 6,510,458 B1 | 1/2003 | Berstis et al. | 709/219 |
| 6,530,061 B1 | 3/2003 | Labatte | 714/807 |
| 6,567,855 B1 | 5/2003 | Tubbs et al. | 709/232 |
| 6,609,225 B1 | 8/2003 | Ng | 714/781 |
| 6,625,147 B1 | 9/2003 | Yokoyama et al. | |
| 6,629,141 B2 | 9/2003 | Elzur et al. | 709/224 |
| 6,713,201 B2 | 3/2004 | Bullock et al. | 429/12 |
| 6,765,901 B1 | 7/2004 | Johnson et al. | 370/352 |
| 6,773,344 B1 | 8/2004 | Gabai et al. | 463/1 |
| 6,800,013 B2 | 10/2004 | Liu | 446/297 |
| 6,949,002 B2 | 9/2005 | Yamaguchi et al. | 446/454 |
| 6,980,559 B2 | 12/2005 | Kichise | |
| 6,996,070 B2 | 2/2006 | Starr et al. | |
| 7,165,112 B2 | 1/2007 | Battin et al. | |
| 7,167,927 B2 * | 1/2007 | Philbrick et al. | 709/250 |
| 7,330,918 B2 * | 2/2008 | Yamamoto et al. | 710/56 |
| 7,535,913 B2 | 5/2009 | Minami et al. | |
| 2001/0021949 A1 | 9/2001 | Blightman et al. | 709/219 |
| 2001/0023460 A1 | 9/2001 | Boucher et al. | 709/250 |
| 2001/0027496 A1 | 10/2001 | Boucher et al. | 709/250 |
| 2001/0030958 A1 * | 10/2001 | Kichise | 370/352 |
| 2001/0047433 A1 | 11/2001 | Boucher et al. | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0120899 A1 | 8/2002 | Gahan et al. | 714/748 |
| 2002/0147839 A1 | 10/2002 | Boucher et al. | 709/238 |
| 2002/0163888 A1 | 11/2002 | Grinfeld | 370/235 |
| 2002/0188839 A1 * | 12/2002 | Noehring et al. | 713/153 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |
| 2003/0016669 A1 | 1/2003 | Pfister et al. | 370/392 |
| 2003/0031172 A1 | 2/2003 | Grinfeld | 370/389 |
| 2003/0046330 A1 | 3/2003 | Hayes | 709/201 |
| 2003/0046418 A1 | 3/2003 | Raval et al. | 709/237 |
| 2003/0056009 A1 | 3/2003 | Mizrachi et al. | 709/245 |
| 2003/0058870 A1 | 3/2003 | Mizrachi et al. | 370/395.52 |
| 2003/0061505 A1 | 3/2003 | Sperry et al. | 713/200 |
| 2003/0066011 A1 | 4/2003 | Oren | 714/758 |
| 2003/0081599 A1 * | 5/2003 | Wu et al. | 370/389 |
| 2003/0084185 A1 | 5/2003 | Pinkerton | 709/236 |
| 2003/0095567 A1 | 5/2003 | Lo et al. | 370/466 |
| 2003/0115350 A1 | 6/2003 | Uzrad-Nali et al. | 709/231 |

| | | | | |
|---|---|---|---|---|
| 2003/0115417 | A1 | 6/2003 | Corrigan | 711/118 |
| 2003/0128704 | A1 | 7/2003 | Mizrachi et al. | 370/394 |
| 2003/0145101 | A1 | 7/2003 | Mitchell et al. | 709/236 |
| 2003/0145270 | A1 | 7/2003 | Holt | 714/766 |
| 2003/0165160 | A1* | 9/2003 | Minami et al. | 370/466 |
| 2003/0167346 | A1 | 9/2003 | Craft et al. | 709/250 |
| 2003/0200284 | A1 | 10/2003 | Philbrick et al. | 709/219 |
| 2004/0062267 | A1 | 4/2004 | Minami et al. | 370/463 |
| 2004/0190512 | A1* | 9/2004 | Schultz | 370/389 |
| 2005/0117582 | A1 | 6/2005 | Biran et al. | 370/395.4 |
| 2005/0122986 | A1* | 6/2005 | Starr et al. | 370/412 |
| 2005/0182841 | A1* | 8/2005 | Sharp | 709/228 |
| 2005/0223110 | A1 | 10/2005 | Honary et al. | 709/236 |
| 2005/0226144 | A1 | 10/2005 | Okita | 370/219 |
| 2006/0168281 | A1* | 7/2006 | Starr et al. | 709/230 |
| 2007/0058534 | A1* | 3/2007 | Shimonishi et al. | 370/230 |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |
| CA | 2328829AA | 12/1999 |
| CA | 2265692 C | 8/2001 |
| CN | 1237295 A | 12/1999 |
| CN | 1266512 T | 9/2000 |
| CN | 1305681 T | 7/2001 |
| JP | 11196187 | 7/1999 |
| JP | 11196187 A | 7/1999 |
| JP | 11313091 A | 11/1999 |
| JP | 2000196669 A | 7/2000 |
| TW | 447205 B | 7/2001 |
| TW | 448407 B | 8/2001 |
| WO | 9808344 | 2/1998 |
| WO | WO 9808344 A2 | 2/1998 |
| WO | WO98/21655 | 5/1998 |
| WO | WO 98/21655 | 5/1998 |
| WO | WO 98/50852 | 11/1998 |
| WO | 99/39488 | 8/1999 |
| WO | WO 9939488 A | 8/1999 |
| WO | WO 99/65219 | 12/1999 |
| WO | WO 01/13583 | 2/2001 |
| WO | WO 01/28179 | 4/2001 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |

OTHER PUBLICATIONS

Chesson, Greg, "Proceedings of the Summer 1987 USENIX Conference" USENIX Association Jun. 8-12, 1987.
G. Chesson and L. Green, "XTP Protocol Engine VLSI for Real-Time LANS" EFOC/LAN Jun. 29-Jul. 1, 1968.
Stevens, Richard W., "TCP/IP Illustrated Volume" Addison-Wesley Professional Computing Series.
Abbot, Mark B., and Peterson, Larry L., "Increasing Network Throughput by Integrating Protocol Layers" IEEE 1993.
Wright, Maury, "Low-Cost Control LANs Add Automation to Homes, Autos, and Offices" EDN Jul. 20, 1992.
Preston, David J., "Internet Protocols Migrate to Silicon for Networking Devices" Electronic Design Apr. 14, 1997.
Muller, Raimund, "LON—das universelle Netzwerk" Electronik 22/1991.
Rang, Michael ad Tantawy, Ahmed, "A Design Methodology for Protocol Processors" IEEE 1995.
Banks, David and Prudence, Michael, "A High-Performance Network Architecture for a PA-RISC Workstation" IEEE Journal vol. II, No. 22 Feb. 1993.
Steenkiste, Peter, "A High-Speed Network Interface for Distributed-Memory Systems: Architecture and Applications" ACM Transactions on Computer Systems, vol. 15, No. 1 Feb. 1997.
Doumenis, Gr.A., Konstantoulakis, G.E., Reisis, D.I.and Stassinopoulos, G.I. "A Personal Computer Hosted Terminal Adapter for the Broadband Integrated Services Digital Network and Applications" National Technical University of Athens, Greece.
Womack, Lucas; Mraz, Ronald; Mendelson, Abraham, "A Study of Virtual Memory MTU Reassembly withing the PowerPC Architecture" IEEE 1997.
Steenkiste, Peter, "A Systematic Approach to Host Interface Design for High-Speed Networks" IEEE Mar. 1994.
Wittie, Larry D., Ma, Fanyuan, "A TCP/IP Communication Subsystem in Micros" IEEE 1987.
Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.
Gupta, Pankaj; McKeown, Nick, "Algorithms for Packet Classification" IEEE Network Mar./Apr. 2001.
Clark, David D.; Jacobson, Van; Romkey, John; Salwen, Howard, "An Analysis of TCP Processing Overhead" IEEE Jun. 1989.
Goloi, W.K.; Behr, P. "An IPC Protocol and Its Hardware Realization for a High-Speed Distributed Multicomputer System" IEEE 1981.
Ames, Richard, "Building an Embedded Web Server from Scratch" Circuit Cellar INK Feb. 1998.
Legg, John, "Choosing and implementing an embedded TCP/IP Stack" Electronic Product Design Jan. 1999.
Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.
Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.
Varada, S.; Yang, Y.; Evans, D., "Data and Buffer Management in ATM Systems" TranSwitch Corporation.
Bonjour, Dominique; de Hauteclocque, Gaelle; le Moal, Jacques, "Design and Application of ATM LAN/WAN Adapters" IEEE 1998.
Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.
Steenkiste, Peter, "Design, Implementation, and evaluation of a Single-copy Protocol Stack" Software—Practice and Experience, vol. 28, Jun. 1998.
Meleis, Hanafy E.; Serpanos, Dimitrios, N., "Designing Communication Subsystems for High-Speed Networks" IEEE Network Jul. 1992.
Doumenis, Gr. A.; Reisis, D.I.; Stassinopoulos, G.I., "Efficient Implementation of the SAR Sub layer and the ATM Layer in High-Speed Broadband ISDN Data Terminal Adapters" IEEE 1993.
Mora, F.; Sebastia, A., "Electronic Design of a High Performance Interface to the SCI Network" IEEE 1998.
Eady, Fred, "Embedded Internet Part 2: TCP/IP and a 16-Bit Compiler" Embedded PC Jun. 1999.
Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.
Mansour, Mohammad; Kayssi, Ayman, "FPGA-Based Internet Protocol Version 6 Router" IEEE 1998.
Smith, Jonathon M.; Traw, C. Brendan S., "Giving Applications Access to Gb/s Networking" IEEE Network Jul. 1993.
Traw, C. Brendan S.; Smith, Jonathan M., "Hardware/Software Organization of a High-Performance ATM Host Interface" IEEE 1993.
Nagata, Takahiko; Hosoda, Yamashita, Hiroyuki, "High-Performance TCP/IP/ATM Communication Board" NTT Information and Communication Systems Laboratories 1998.
Nagata, Takahiko; Hosoda, Yasuhiro; Yamahsita, Hiroyuki, "High-Performance TCP/IP/ATM Communication Boards: Driving Force for Various Multimedia Services" vol. 9 No. 6 Nov. 1997.
Jolitz, William Frederick, "High-Speed Networking: Header prediction and forward-error correction for very high-speed data transfer" Dr. Dobbs Journal, Aug. 1992.
Chiswell, Dave "Implementation Challenges for 155Mbit ATM Adapters" ISBN# 0-7803-2636-9.

Wright, Maury "Intelligent Ethernet Boards" EDN Jun. 23, 1988.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huang, Jau-Hsiung; Chen, Chi-Wen, "On Performance Measurements of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, Parallel Host Interface for an ATM Network IEEE Network Jul. 1993.

Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.

Laskman, T.V.; Madhow, U., "Performance Analysis of Window-based Flow Control using TCP/IP: Effect of High Bandwidth Delay Products and Random Loss" High Performance Networking V. 1994 IFIP.

Ramakrishnan, K.K., "Performance Considerations in Designing Network Interfaces" IEEE Journal 1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the Shrimp Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" IEEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997 Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

Margolin, Bob, "Smarter Stuff" http://www.byte.com/art/9706/sec6/art2.htm, Jun. 1997.

Panian et al. "The IP Modem Interface Standard: Draft" Portable Computer Communications Association, Brookdale, CA., Jan. 11, 1999.

Wayner, "Sun Gambles on Java Chips", Byte.com, Nov. 1996.

Agrawal et al. "Architecture and Design of the Mars Hardware Accelerator", ACM 1987, pp. 101-107.

Case, "Implementing the Java Virtual Machine", Microprocessor Report, Mar. 1996.

Johnson et al. , "Internet Tuner", New Media News, http://www.newmedianews.corn/020197/ts.sub- inettuner.html, Jan. 1997.

Martin et al., "An Alternative to Government Regulation and Censorship: Content Advisory Systems for the Internet" http://penta2.ufrgs.br/gereseg/censura/rsac/diannel.htm.

8802-3:2000 ISO/IEC Information Technology, http://www.computer.org/cspress/CATALOG/st01118.htm.

INCITS: Development work conducted in t10-I/O Interface-Lower Level Sep. 30, 2002 Weber, Ralph O.

Office Action from U.S. Appl. No. 10/049,972 mailed Nov. 3, 2005.

PCT International Search Report from application No. PCT/US05/37941 mailed on Oct. 2, 2006.

Office Action Summary from U.S. Appl. No. 10/049,972 which was mailed on Jan. 27, 2006.

Advisory Action from U.S. Appl. No. 10/049,972 which was mailed on Mar. 30, 2006.

Answer from U.S. Appl. No. 10/049,972 which was mailed on May 9, 2007.

Answer from U.S. Appl. No. 10/049,972 which was mailed on Jan. 31, 2007.

Martin et al., "An Alternative to Government Regulation and Censorship: Content Advisory Systems for the Internet." Jul. 7, 1997. http://penta2.ufrgs.br/gereseg/censura/rsac/dianna_I .htm Recreational Software Advisory Council, pp. 1-11.

Margolin, Bob, "Smarter Stuff" http://www.byte.com/art/9706/sec6/art2.htm, Jun. 1997.

Office Action Summary from U.S. Appl. No. 10/049,972 mailed on May 3, 2005.

Panian et al., "The IP Modem Interface Standard: Draft" Portable Computer Communications Association, Brookdale, CA, Jan. 11, 1999.

U.S. Appl. No. 10/049,972, filed Feb. 13, 2002.

Chinese Office Action from Chinese Application No. 200580035744.6 mailed on Sep. 16, 2009.

International Preliminary Report on Patentability from PCT Application No. PCT/US2005/037941 issued on Apr. 24, 2007.

Japan Office Action from Application No. 2007-538074 mailed on Dec. 9, 2009.

Notice of Reasons for Rejection from Japanese Patent Application No. 2007-538074, dated Jun. 8, 2010.

Majima, A, et al. Development of Resource Reservation Mechanism for Multimedia Communication, Joho Shori Gakkai Kenkyu Hokoku, 2000, vol. 2000, No. 75, pp. 17-22, Japan.

Notice of Preliminary Rejection from Korean Patent Application No. 10-2007-7008944, dated Sep. 13, 2010.

Notice of Final Rejection from Japanese Patent Application No. 2007-538074, dated Nov. 24, 2010.

Office Action from Chinese Patent Application No. 200580035744.6, dated Nov. 24, 2010.

Sung, D. K., Mobile Communications Systems (MCS), EE624, Korea Advanced Institute of Science and Technology, Communication Networks Research Lab, 2000, pp. 1-17 .

Frazier, G. L. et al., The Design and Implementation of a Multi-Queue Buffer for VLSI Communication Switches, Proceedings of the International Conference on Computer Design, Cambridge, Massachusetts, Oct. 1989, pp. 466-471.

* cited by examiner

SYSTEM AND METHOD FOR PROCESSING RX PACKETS IN HIGH SPEED NETWORK APPLICATIONS USING AN RX FIFO BUFFER

FIELD OF THE INVENTION

The present invention relates to network communications, and more particularly to processing received (RX) packets.

BACKGROUND OF THE INVENTION

Transport offload engines (TOE) include technology that is gaining popularity in high-speed systems for the purpose of optimizing throughput, and lowering processor utilization. TOE components are often incorporated into one of various printed circuit boards, such as a network interface card (NIC), a host bus adapter (HBA), a motherboard; or in any other desired offloading context.

In recent years, the communication speed in systems has increased faster than processor speed. This has produced an input/output (I/O) bottleneck. The processor, which is designed primarily for computing and not for I/O, cannot typically keep up with the data flowing through the network. As a result, the data flow is processed at a rate slower than the speed of the network. TOE technology solves this problem by removing the burden (i.e. offloading) from the processor and/or I/O subsystem.

One type of processing often offloaded to the TOE includes Transmission Control Protocol (TCP) packet processing. TCP is a set of rules (protocol) used along with the Internet Protocol (IP) to send data in the form of message units between computers over the Internet. While IP takes care of handling the actual delivery of the data, TCP takes care of keeping track of the individual packets that a message is divided into for efficient routing through the Internet.

Handling TCP packets on a high speed network requires much processing. Packets may arrive out of sequence and therefore must be stored if data is to be passed to an application in sequence. Additionally, the processing of received packets must be able to keep up with the line rate of the network connection.

There is thus a need for a technique of accelerating TCP and other packet processing.

SUMMARY OF THE INVENTION

A system and method are provided for processing packets received via a network. In use, data packets and control packets are received via a network. Further, the data packets are processed in parallel with the control packets.

In one embodiment, the control packets may be processed utilizing a first processing path and the data packets may be processed utilizing a second processing path, separate from the first processing path.

In another embodiment, the processing of the packets may include utilizing, in parallel, a look-up table and a cache in order to identify a correct socket control block associated with the packets. Similarly, the processing of the data packets may include utilizing, in parallel, substantially duplicate logic in order to identify a correct socket control block associated with the packets.

In yet another embodiment, control blocks associated with the packets may be updated in parallel with processing of subsequent packets.

As a further option, tag information may be prepended to the data packets. Such tag information may further be prepended to the data packets while buffered in a receiver (RX) first-in-first-out (FIFO) buffer. Optionally, the tag information may include the type of the corresponding packet, a socket handle associated with the corresponding packet, status information associated with the corresponding packet, and/or control information associated with the corresponding packet.

In use, the data packets may be buffered utilizing a RX FIFO buffer.

DETAILED DESCRIPTION

Figure 1:
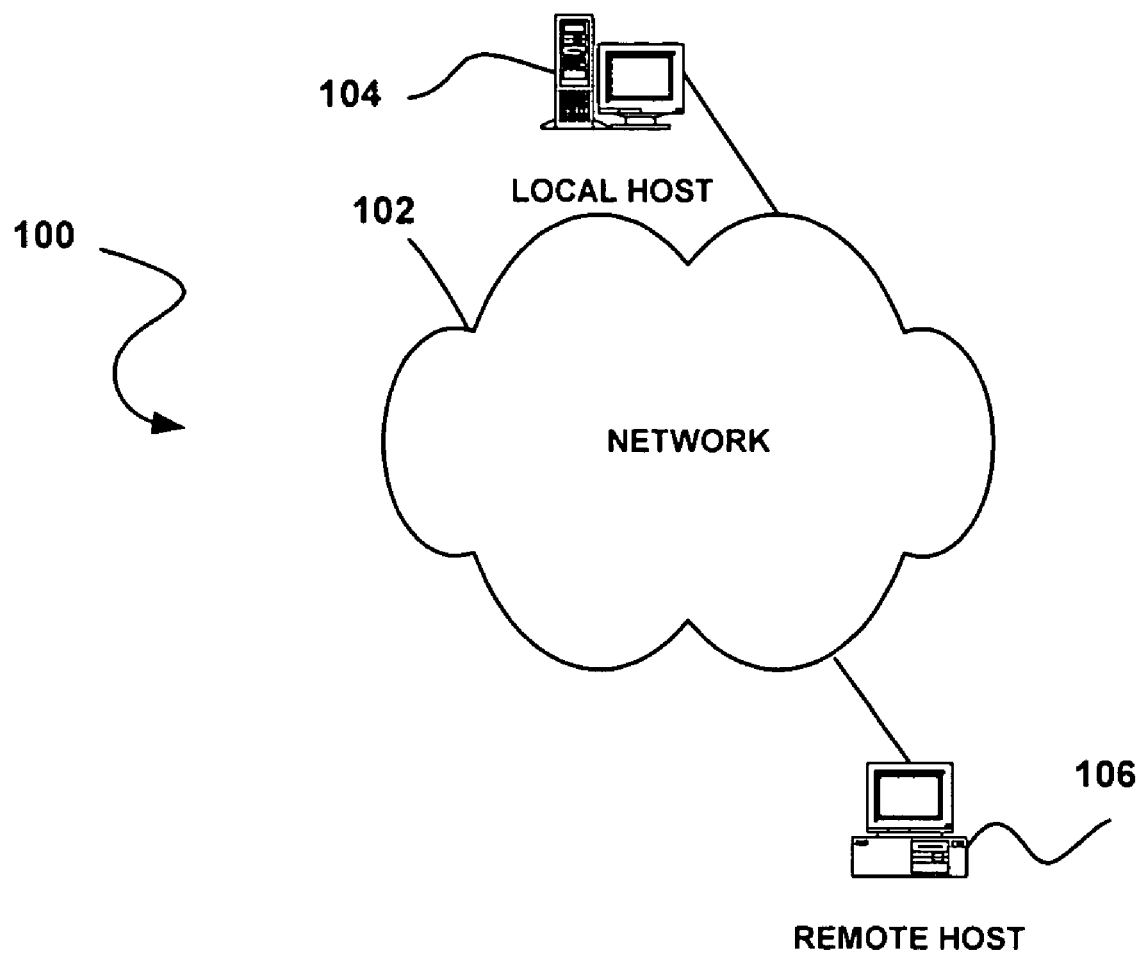
FIG. 1 illustrates a network system, in accordance with one embodiment.

FIG. 1 illustrates a network system 100, in accordance with one embodiment. As shown, a network 102 is provided. In the context of the present network system 100, the network 102 may take any form including, but not limited to a local area network (LAN), a wide area network (WAN) such as the Internet, etc.

Coupled to the network 102 are a local host 104 and a remote host 106 which are capable of communicating over the network 102. In the context of the present description, such hosts 104, 106 may include a web server, storage device or server, desktop computer, lap-top computer, hand-held computer, printer or any other type of hardware/software. It should be noted that each of the foregoing components as well as any other unillustrated devices may be interconnected by way of one or more networks.

Figure 2:
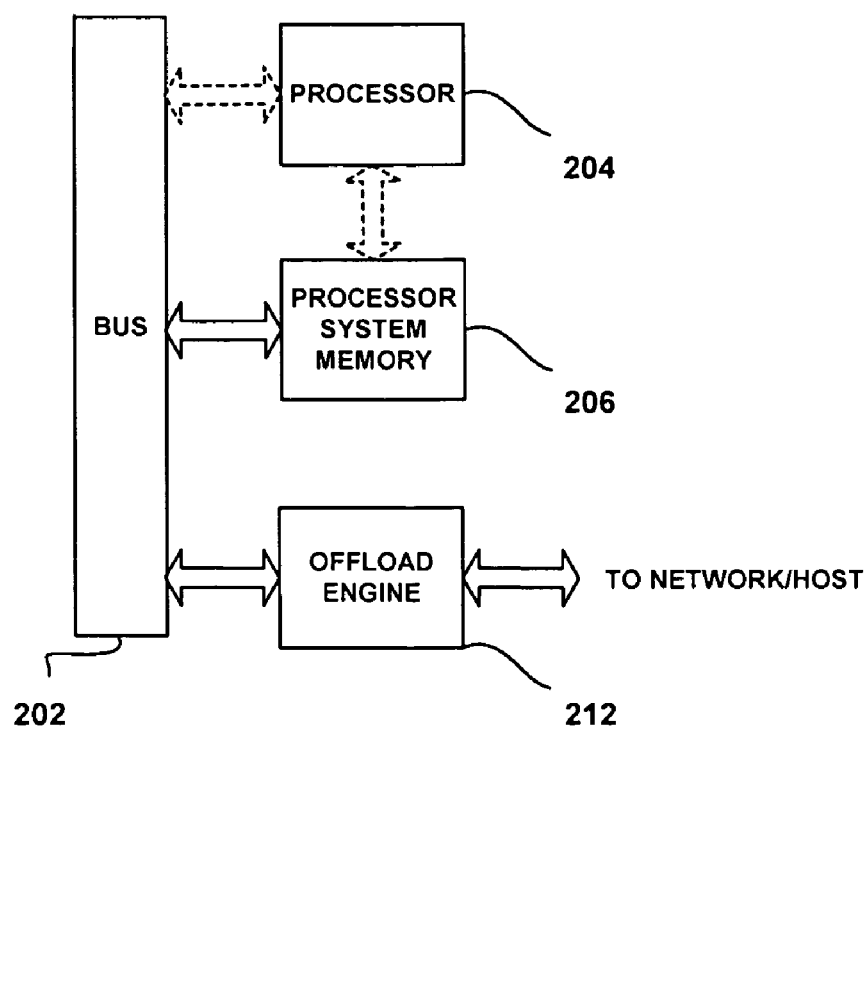
FIG. 2 illustrates an architecture in which one embodiment may be implemented.

FIG. 2 illustrates an exemplary architecture 200 in which one embodiment may be implemented. In one embodiment, the architecture 200 may represent one of the hosts 104, 106 of FIG. 1. Of course, however, it should be noted that the architecture 200 may be implemented in any desired context.

For example, the architecture 200 may be implemented in the context of a general computer system, a circuit board system, a game console system dedicated for entertainment purposes, a set-top box, a router, a network system, a storage system, an application-specific system, or any other desired system associated with the network 102.

As shown, the architecture 200 includes a plurality of components coupled via a bus 202. Included is at least one processor 204 for processing data. While the processor 204 may take any form, it may, in one embodiment, take the form of a central processing unit (CPU), a graphics module, a chipset (i.e. a group of integrated circuits designed to work and sold as a unit for performing related functions, etc.), a combination thereof, or any other integrated circuit for that matter. In the example of a graphics module, such integrated circuit may include a transform module, a lighting module, and a rasterization module. Each of the foregoing modules may be situated on a single semiconductor platform to form a graphics processing unit (GPU).

Further included is processor system memory 206 which resides in communication with the processor 204 for storing the data. Such processor system memory 206 may take the form of on-board or off-board random access memory (RAM), a hard disk drive, a removable storage drive (i.e., a floppy disk drive, a magnetic tape drive, a compact disk drive, etc.), and/or any other type of desired memory capable of storing data.

In use, programs, or control logic algorithms, may optionally be stored in the processor system memory 206. Such programs, when executed, enable the architecture 200 to perform various functions. Of course, the architecture 200 may simply be implemented directly in hardwired gate-level circuits.

Further shown is a transport offload engine 212 in communication with the processor 204 and the network (see, for example, network 102 of FIG. 1). In one embodiment, the transport offload engine 212 may remain in communication with the processor 204 via the bus 202. Of course, however, the transport offload engine 212 may remain in communication with the processor 204 via any mechanism that provides communication therebetween. The transport offload engine 212 may include a transport (i.e. TCP/IP) offload engine (TOE), system, or any integrated circuit(s) that is capable of managing the data transmitted in the network.

While a single bus 202 is shown to provide communication among the foregoing components, it should be understood that any number of bus(es) (or other communicating mechanisms) may be used to provide communication among the components. Just by way of example, an additional bus may be used to provide communication between the processor 204 and processor system memory 206. Further, in one embodiment, any two or more of the components shown in FIG. 2 may be integrated onto a single integrated circuit.

During operation, the transport offload engine 212, processor 204 and/or software works to process packets received via a network (i.e. see, for example, network 102 of FIG. 1, etc.). In accordance with one embodiment, data packets and control packets are received via a network. Further, the data packets are processed in parallel with the processing of the control packets.

In context of the present description, "data packets" may refer to any packets that are used to communicate data, while "control packets" may refer to any packets that exhibit any aspect of control over network communications. Moreover, "parallel" may refer to processing where any aspect of the data packets and control packets are processed, at least in part, simultaneously. To this end, received packet processing is enhanced.

In another embodiment, the processing of the packets may include utilizing, in parallel, substantially duplicate logic and/or multiple data structures (i.e. a look-up table and a cache, etc.) in order to identify a correct socket control block (CB) associated with the packets. As an option, during such search mode (i.e. when such CB is being identified), if the correct socket control block is not in the cache, the correct socket control block may be retrieved from a main memory, where the retrieved correct socket control block is not stored in the cache when in the search mode. In the context of the present description, a CB may include any information capable of being used to track a connection attempt and/or connection.

By utilizing the identification results of the data structure that first correctly identifies the CB, the foregoing identification process is accelerated. Further, by utilizing substantially duplicate logic, the CB identification process may be simultaneously carried out for multiple packets, thus providing further acceleration.

As a further option, tag information may be prepended to the packets (i.e. data packets and/or control packets, etc.). Such tag information may further be prepended to the packets while buffered in a receiver (RX) first-in-first-out (FIFO) buffer. By prepending the tag information, the received packets may be stored while the foregoing CB identification is carried out. Further, as an option, there may possibly be no need for a separate buffer for the tag information.

In still yet another embodiment, CB's may be updated, as additional packets are received. Thus, in use, a CB associated with a first packet may be updated. Further, after at least starting the updating of the CB associated with the first packet and before finishing the updating, the processing of a second packet may be started, thus enhancing performance. To this end, packet processing may be carried out in parallel with CB updating, thus reducing the possibility of a bottleneck in one of the processes creating a bottleneck in the other.

More optional features and exemplary implementation details will now be set forth regarding the above embodiments. It should be noted that the following details are set forth for illustrative purposes only, and should not be construed as limiting in any manner.

Figure 3:
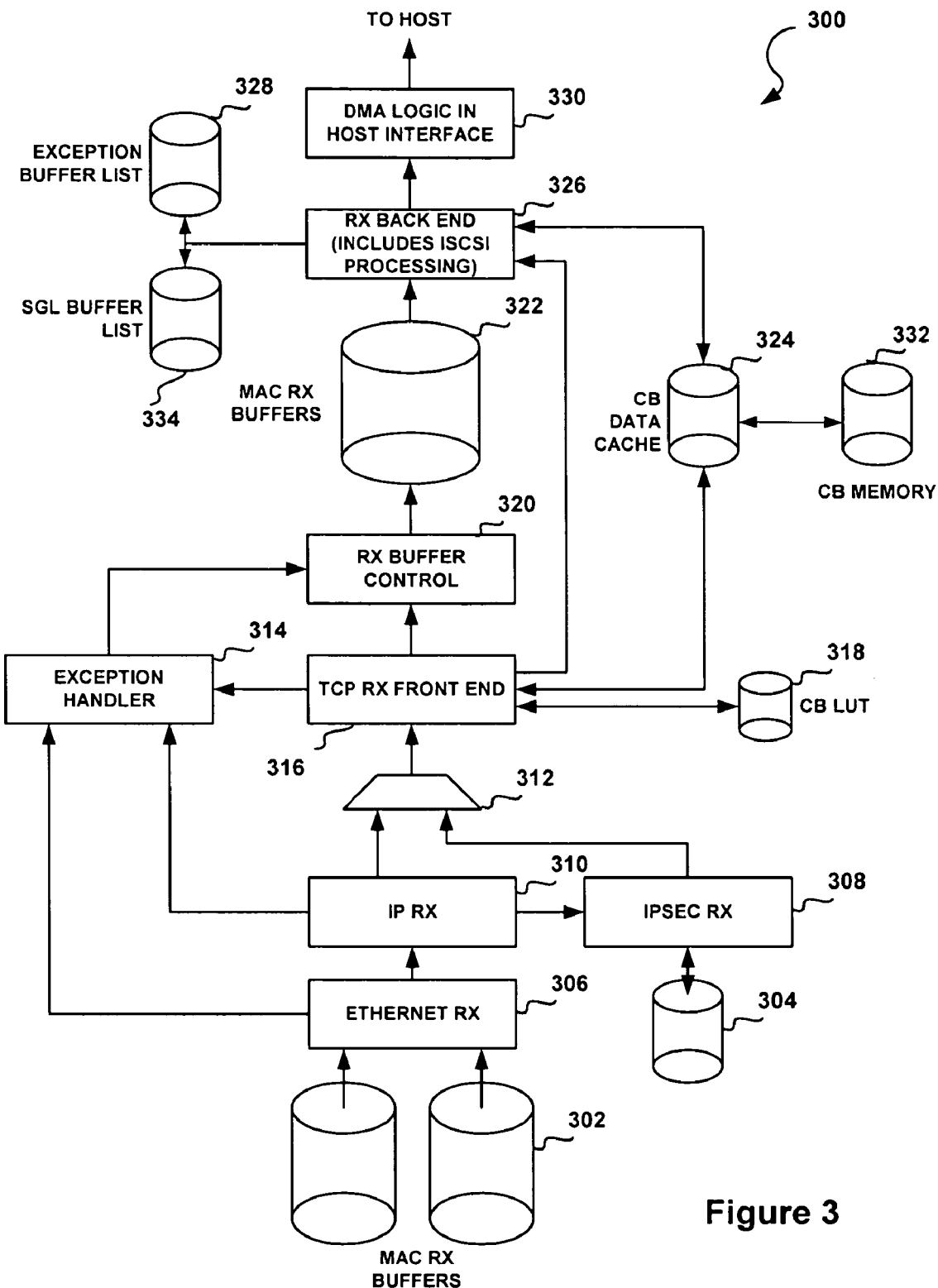
FIG. 3 illustrates a specific example of architecture for processing received packets, in accordance with one embodiment.

FIG. 3 illustrates an exemplary architecture 300 for processing received packets, in accordance with one embodiment. As an option, the architecture 300 may be implemented in the context of the exemplary architecture 200 of FIG. 2. Of course, however, it should be noted that the architecture 300 may be implemented in any desired context.

As shown, a plurality of media access control (MAC) RX buffers 302 are provided for receiving both data and control packets from a plurality of networks 102. It should be noted that the RX buffers 302 are not necessarily for the plurality of networks 102. One embodiment may include one buffer for a single network. Such MAC RX buffers 302 feed an Ethernet RX 306 which, in turn, feeds both an Internet Protocol (IP) RX 310 and an exception handler 314. All IP packets are sent to the IP RX 310 and all other packets are sent to the exception hander 314.

Within the IP RX 310, the packet IP header is parsed. All Internet protocol security (IPSEC) protocol packets are then sent to an IPSEC RX handler 308 and stored in an IPSEC RX buffer 304, and all TCP or UDP packets are sent to the TCP RX front-end module 316. All other packets are sent to the exception hander 314. A multiplexer 312 selects between normal TCP/UDP packets from the IP RX 310 and processed IPSEC packets from the IPSEC RX handler 308.

In use, the TCP RX front-end module 316 parses incoming TCP packets to determine if a received packet either contains TCP data or is a TCP control packet. Separate processing paths are then provided for each packet type. To this end, packet processing is enhanced, in the manner set forth hereinabove. Further, the processing of the packets may include utilizing, in parallel, substantially duplicate logic and/or multiple data structures [i.e. a look-up table (see CB look-up table 318) and a CB cache (see CB data cache 324), etc.] in order to identify a correct socket CB associated with the packets.

Still yet, for the reasons set forth hereinabove, data packets are stored in MAC RX FIFO buffers 322 while simultaneously searching for the corresponding CB associated with the packet. After the data packet has been stored and the CB look up is complete, tag information may be prepended to the data packets in the MAC RX FIFO buffers 322. In still yet another aspect of the TCP RX front-end module 316, a CB associated with a first packet may be updated. After at least starting the updating of the CB associated with the first packet and before finishing the updating, the processing of a second packet may be started, thus enhancing performance.

Figure 4:
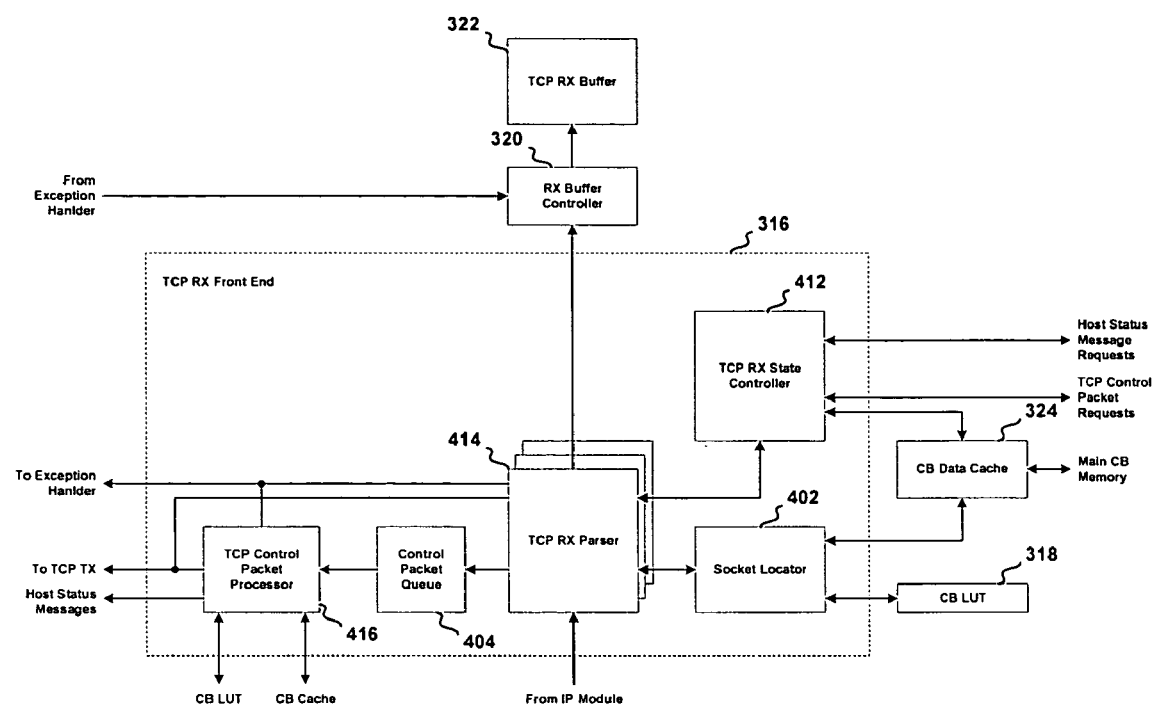
FIG. 4 illustrates an exemplary front-end module for processing received packets, in accordance with one embodiment.

More information regarding such TCP RX front-end module 316 functionality and optional implementation detail will be set forth in greater detail during reference to FIG. 4 and the accompanying description.

With continuing reference to FIG. 3, the TCP RX front-end module 316 feeds an exception handler 314. All packets that are identified as causing any logic exception are sent to the exception handler 314. As an example, packets that match a received filter setting, or contain unsupported options may be sent to the exception handler 314. As stated above, normal data packets are stored in the MAC RX FIFO buffers 322 via an RX buffer controller 320. This RX buffer controller 320 accepts requests to store packets from either the exception handler 314 or the TCP RX front-end module 316, and arbitrates between the two sources. More information regarding such interaction will be set forth hereinafter in greater detail.

The RX buffer controller 320 feeds additional MAC RX FIFO buffers 322 which, in turn, feed the RX back-end module 326. The MAC RX FIFO buffers 322 are thus coupled between the front-end module and the back-end module for providing a boundary therebetween and decoupling the same.

As shown in FIG. 3, the TCP RX front-end module 316 indicates to the RX back-end module 326 that packets are available for servicing in the MAC RX FIFO buffers 322. As will soon become apparent, the RX back-end module 326 handles application level processing such as the Internet small computer system interface (iSCSI) protocol or any other desired protocol [i.e. RDMA (remote data memory access), etc.]. More information regarding such RX back-end module 326 functionality and optional implementation detail will be set forth in greater detail during reference to FIG. 5 and the accompanying description.

Finally, the RX back-end module 326 uses both scatter-gather list (SGL) 334 [and/or possibly memory descriptor list (MDL)], and anonymous buffer lists 328, as well as direct memory access (DMA) logic 330, to store the received packets in host memory (i.e. see, for example, the processor system memory 206, 106 of FIG. 2). In the context of the present description, an SGL may include any data list object provided to describe various locations in memory where incoming data is ultimately stored.

FIG. 4 illustrates an exemplary TCP RX front-end module 316 for processing received packets, in accordance with one embodiment. As an option, the TCP RX front-end module 316 may be implemented in the context of the exemplary architecture 300 of FIG. 3. Of course, however, it should be noted that the TCP RX front-end module 316 may be implemented in any desired context.

As shown in FIG. 4, the TCP RX front-end module 316 receives data from the IP layer (i.e. via, for example, IP RX 310 of FIG. 3, etc.), and either processes the packet or treats it as an exception. To accomplish this, a TCP RX parser 414 and socket locator module 402 are provided. As an option, multiple TCP RX parsers 414 and socket locator modules 402 may be provided. For that matter, any of the logic modules disclosed herein may be provided in substantially duplicate or even triplicate to enhance processing.

In use, the TCP RX parser 414 is responsible for parsing the received TCP and user datagram protocol (UDP) packets. As an option, all UDP packets may be sent up as exceptions (i.e. via, for example, exception handler module 314 of FIG. 3, etc.) or may be processed in a similar manner to TCP data packets. As a further option, a UDP checksum may be validated, and, if it is bad, the packet may be aborted.

For TCP packets, all data packets are stored in an RX FIFO buffer 322, and all control packets are sent to a control packet queue 404. This determination may be accomplished by examining FLAG bits in the TCP header as well as the packet length. Thus, the control packets may be processed utilizing a first processing path and the data packets may be processed utilizing a second processing path, separate from the first processing path.

If the packet is a data packet, a socket hash is computed by the socket locator module 402. By way of background, each data packet has associated therewith both a pair of IP addresses and a pair of TCP or UDP ports. The hash may be generated based on such IP addresses and ports (i.e. by utilizing the "socket 4-tuple," etc.).

This hash may then be used to index into the CB look-up table 318. A sample CB look-up table 318 is shown in Table 1.

TABLE 1 hash1/(address1 to socket CB1 in memory)
hash2/(address2 to socket CB2 in memory)
hash3/(address3 to socket CB3 in memory)

The CB addresses may be used to identify the location of the appropriate CB in memory, and doubles as the socket handle identifier associated with the CB. CB's typically include such socket handle, along with other information such as the socket state, etc. Within the CB structure is a field that points to the next CB that contains the same generated hash value. In this manner, sockets with hash values that collide can be resolved.

It is then determined, based on a comparison of the socket handle and the actual socket associated with the current packet, whether the socket associated with the CB is the correct socket or not. For example, if the 4-tuple in the packet matches the parameters in the socket CB, the correct CB has been found. If it does not match, the next linked socket handle is read from the CB and that socket CB is then fetched.

This process of retrieving the next linked socket handle continues until the correct socket CB is found or it is determined that no CB is present that can be associated with the received packet. As an option, the size of the CB look-up table 318 may be twice the maximum number of sockets supported in order to reduce the number of hash collisions, and may be located in external memory.

In parallel to this use of the CB look-up table 318, a look-up is performed in the CB data cache 324. The CB data cache 324 contains the most recently used "n" socket CB's (i.e. 32 or so). The CB data cache 324 further contains a hash association table that indicates the generated hash for each CB entry that is present in the CB data cache 324. The socket locator module 402 can then query the CB data cache 324 to determine if a matching CB hash is present in the CB data cache 324. To this end, it is possible to determine if the possible CB match is in the CB data cache 324 within a predetermined amount of time (i.e. a clock of generating the hash).

By utilizing the identification results of the data structure (i.e. CB look-up table 318 or CB data cache 324) that first correctly identifies the CB, the foregoing identification process is accelerated. For example, the maximum number memory reads required to find the correct socket when the CB is not in the CB data cache 324 may be given by Equation #1.

$$\text{\# of clocks} = 1 + p(n), \qquad \text{Equation \#1}$$

where:
the first read is due to the CB look-up table 318 look-up,
n is the number of CB hash collisions for that particular hash, and
p is the number of clock cycles required to read the socket ports and IP addresses from a CB entry.

If the CB is in the CB data cache 324, the maximum number of clocks required to find the CB is given by Equation #2.

$$\text{\# of clocks} = m, \qquad \text{Equation \#2}$$

where:
m refers to the number of CB's in the CB data cache 324 that have the particular hash.

The parameters can be read out fast from the CB data cache 324, since the cache bus width is ideally sized (i.e. 128 bits, etc.).

As a further feature, the CB data cache 324 may allow a special read through mode when the socket locator module 402 is searching for CB's referenced by the CB look-up table 318. In this special read mode, the requested CB is first checked to see if it is located in the CB data cache 324. If it is there, the contents can be returned immediately. However, if it is not located in the CB look-up table 318, it is read from main CB memory, but in this mode, the CB is not pulled into the CB look-up table 318. This is because the search logic at this point is still looking for the CB associated with the received packet. Once the correct CB is located, the handle associated with the CB is passed to the TCP RX state controller 412 which reads the CB through the CB data cache 324. At that time, the CB is retrieved from main CB memory and placed in the CB data cache 324.

Data packets get stored in the RX FIFO buffer 322 at the same time as CB look-ups are being performed. In this manner, for data packets that are larger than a predetermined size (i.e. 80 bytes, etc.), minimal time is lost on average finding the proper CB. Since locating the correct CB is a time critical task, this logic (i.e. TCP RX parser 414 and/or socket locator module 402, etc.) may be substantially duplicated (or even provided in triplicate) in the TCP RX front-end module 316 such that multiple packets received from the IP layer may be processed simultaneously.

This allows the logic to look ahead and start searching for the CB for the next packet while the first packet is still being processed. Once the CB is found and the contents fetched, the packet processing (i.e. determining what to do with the packet, etc.) is done within a few clock cycles.

Returning to the receive processing, if the correct CB is not in the CB data cache 324, it is read from the main CB memory and, at the same time, placed into the CB data cache 324. If the CB is already in the CB data cache 324, it can be read directly. The socket state, control bits, and parameters (including the SEQ and ACK numbers, etc.) may all be obtained using the CB.

Once all of the CB parameters have been fetched, processing of the packet is completed within a predetermined amount of time (i.e. approximately 2 clock cycles) depending on the state of the socket. Therefore, for data packets that are larger than a predetermined size (i.e. 300 byte, on average), processing may be completed by the time the data is stored in the RX FIFO buffer 322. This may apply even if the CB needs to be fetched from main CB memory. If the CB is already in the CB data cache 324, even smaller data packets can be processed with minimal extra time required for packet processing.

Pre-pended to each packet in the RX FIFO buffer 322 is tag information. This tag information may include information on the type of the packet (i.e. exception, TCP data packet, etc.), the socket handle associated therewith, and/or other control and status information. The tag information may be filled in after the entire packet has been received and verified to be valid.

Such tag information may further be prepended to the packets while buffered in a RX FIFO buffer 322. By prepending the tag information in such manner, the received packets may be stored while the foregoing CB identification is carried out. Further, as an option, there may possibly be no need for a separate buffer for the tag information.

Another function of the TCP parser 414 is to validate the TCP checksum. This is done by snooping the packet as it is being parsed and stored in either the RX FIFO buffer 322 (for data packets) or the control packet queue 404 (for TCP control packets). The resulting checksum is combined with the pseudo header checksum provided by the IP layer to produce the final checksum. This check is valid with a predetermined timeframe (i.e. 3 clocks) after the last word from the IP module is read. If the packet is deemed to be bad from either a TCP check sum error or by any other error from any of the lower layers, the packet is dropped from either the RX FIFO buffer 322 or the control packet queue 404.

With continuing reference to FIG. 4, a TCP RX state controller 412 is provided. The TCP RX state controller 412 is responsible for determining the course of action for received TCP data packets. The packet parameters are checked against those in the socket CB. This includes checking a sequence number of the packet, the state of the socket, etc.

The packet is processed as if it will be good, however. That way, after the entire packet is received, all of the processing has already taken place and minimal further calculations are necessary. If the packet turns out bad, the CB is not updated, and the packet is dropped from the RX FIFO buffer 322 or the control packet queue 404. In this case, the write pointers for each buffer is reset to the point it was before the packet arrived.

Once the entire data packet has been stored in the RX FIFO buffer 322, the TCP RX state controller 412 may schedule an ACK via a TCP transmitter module (not shown). Four ACK modes may be supported: normal immediate ACKs, normal delayed ACKs, host-mode immediate ACKs, and host-mode delayed ACKs.

In the normal modes, the ACK or delayed ACK is requested or queued immediately after the data packet is received and determined to be valid. In the two host modes, the ACK is only requested or queued after the host has acknowledged receiving the data via the RX DMA.

Returning again to the TCP RX parser 414, the logic block may separate out pure TCP control packets (i.e. those packets that do not contain any data) from data packets. This is because pure control packets are typically shorter packets, and are not time critical to process. These TCP control packets are detected by the FLAG bit settings in the TCP header, combined with the total length of the packet. If no data is contained in the packet, and the push (PSH) bit is not set, the packet is considered to be a pure control packet.

These packets are diverted to the control packet queue 404 of FIG. 4. The checksum for each packet is calculated as the packet is being diverted, and bad packets are discarded. The socket hash is also calculated and pre-pended to the packet in a separate section. A control packet handler 416 then reads the packet out of the queue and processes the same. The following operations of Table 2 are then performed for the control packets.

TABLE 2

1. The socket hash is looked up in the CB look-up table 318. At the same time, the hash is checked to see if the CB is already in the CB data cache 324.
2. Assuming that the CB is already in the CB data cache 324, the applicable fields are read.
3. If the CB is not in the CB data cache 324, it is read from main CB memory and placed in the data cache 324.
4. Action is then determined by the type of packet that is received and the current state of the socket. These actions could be, but is not limited to, any of the following:
   a. Request a response from the TCP transmitter
   b. Send a status message to the host
   c. Disregard the packet
   d. Send the packet up as an exception
5. After the required action is determined, the CB is updated accordingly.

The look-up and reading of the socket, processing the packet, and updating of the CB are all pipelined operations, thereby allowing the handler to start finding the next socket while the previous control packet is still being processed.

Figure 5:
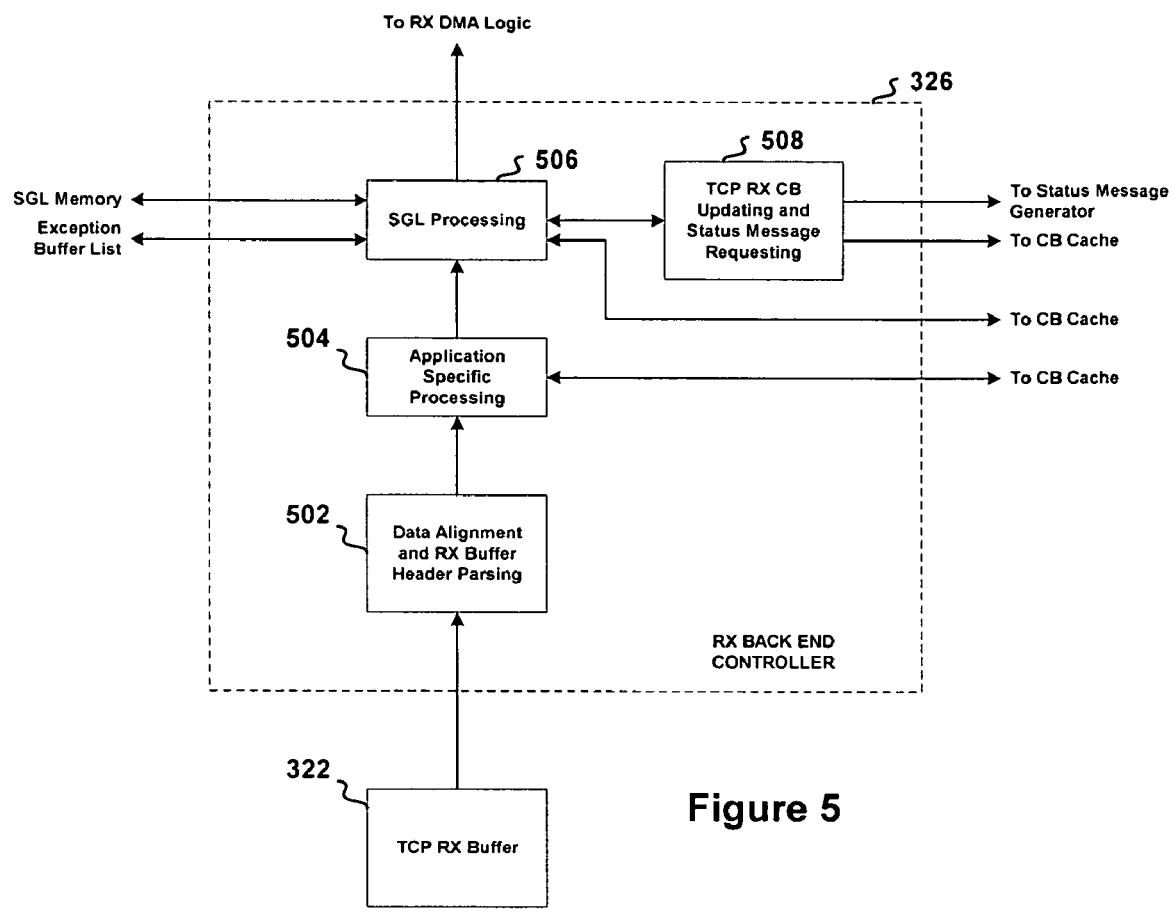
FIG. 5 illustrates an exemplary receiver back-end module for processing received packets, in accordance with one embodiment.

FIG. 5 illustrates an exemplary RX back-end module 326 for processing received packets, in accordance with one embodiment. As an option, the RX back-end module 326 may be implemented in the context of the exemplary architecture 300 of FIG. 3. Of course, however, it should be noted that the RX back-end module 326 may be implemented in any desired context.

Once the packet has been completely stored in the RX FIFO buffer 322 and the packet buffer header filled, the RX back-end module 326 begins to process the same. The RX back-end module 326 starts by parsing and stripping the packet buffer header, utilizing a data alignment and RX buffer header parsing module 502. This tells the RX back-end module 326 the type of the packet (i.e. exception or TCP data packet), the CB handle associated with the packet, and other status and control information, as noted above. In one embodiment, the headers may be 256 bits in length.

After the packet buffer header is parsed and stripped, the packet is re-aligned. This re-alignment may be needed because for normal TCP (and optionally UDP) data packets; the packet Ethernet, IP, and TCP headers are also stripped. Stripping of these headers may cause the resulting data to be non-FIFO word aligned, and the re-alignment makes it simpler for subsequent logic modules to operate on the packet data.

After the re-alignment, the packet may be optionally passed through application specific processing logic 504. This logic may include, but is not limited to, logic that implements the iSCSI protocol or remote direct memory access (RDMA) functions. For iSCSI support, this module may perform iSCSI cyclic redundancy checking (CRC) verification, iSCSI protocol data unit (PDU) header parsing, and fixed interval marker (FIM) removal.

All exception packets (from every layer in the network stack) are sent to host memory as specified in an exception buffer list (i.e. temporary buffers, holding buffers, eddy buffers, etc.). The exception list (i.e. see, for example, list 328 of FIG. 3, etc.) is provided by the host driver. The list may be continuously augmented by the host as buffers are used. Retrieving exception buffer addresses and managing of the exception buffer list is managed by the SGL processing logic 506.

Regular TCP data that arrives on a socket usually use a socket specific SGL to specify where in host memory the data should be stored. The SGL (i.e. see, for example SGL 334 of FIG. 3, etc) is provided by the host driver. The list may be continuously augmented by the host as the list is used. In the context of the present description, an SGL may include any data list object provided to describe various locations in memory where incoming data is ultimately stored. When data is received on a socket, but the SGL associated with the socket does not contain any valid buffer addresses, the received data is also sent to host memory using the exception buffer list. SGL management is also handled by the SGL processing logic 506.

For normal TCP data packets, SGL entries are first retrieved from the SGL memory 334. A sequence number of the received packet indicates where in the SGL the data should be placed. This allows the correct alignment of even out of sequence (OOS) data properly. For data received in order, only one read from the SGL is required to obtain a host address of where to store the data.

A request to DMA the data into processor system memory can then be made. When the DMA request is granted, the data is read from the RX FIFO buffer 322 and sent to a host DMA interface 330 (see FIG. 3) where it is DMA'ed into processor system memory 206 at the specified address. Multiple SGL's are supported per socket so that a ping-pong mode of operation is possible. This allows the host driver to provide the next SGL as soon as one is expired, without having any data diverted to anonymous buffers.

In cases where a single data packet spans more than one SGL entry, the next SGL entry may be fetched and processed while the first part of the packet is being DMA'ed. In this way, subsequent DMA requests are made immediately after the completion of each request.

Once the DMA is complete, status messages may optionally be generated to inform the host driver that data has arrived. At this time, certain CB parameters are also updated using a TCP RX CB updating and status message request module 508.

The parsing of the packet headers, fetching the SGL's, DMA'ing the data, and updating the CB may all be pipelined operations. This allows the RX back-end module 326 to start processing the next packet header even while the DMA for the previous packet is still completing, ensuring maximum throughput of data. Again, any of the logic modules disclosed herein may be provided in substantial duplicate or even triplicate to enhance processing.

Figure 6:
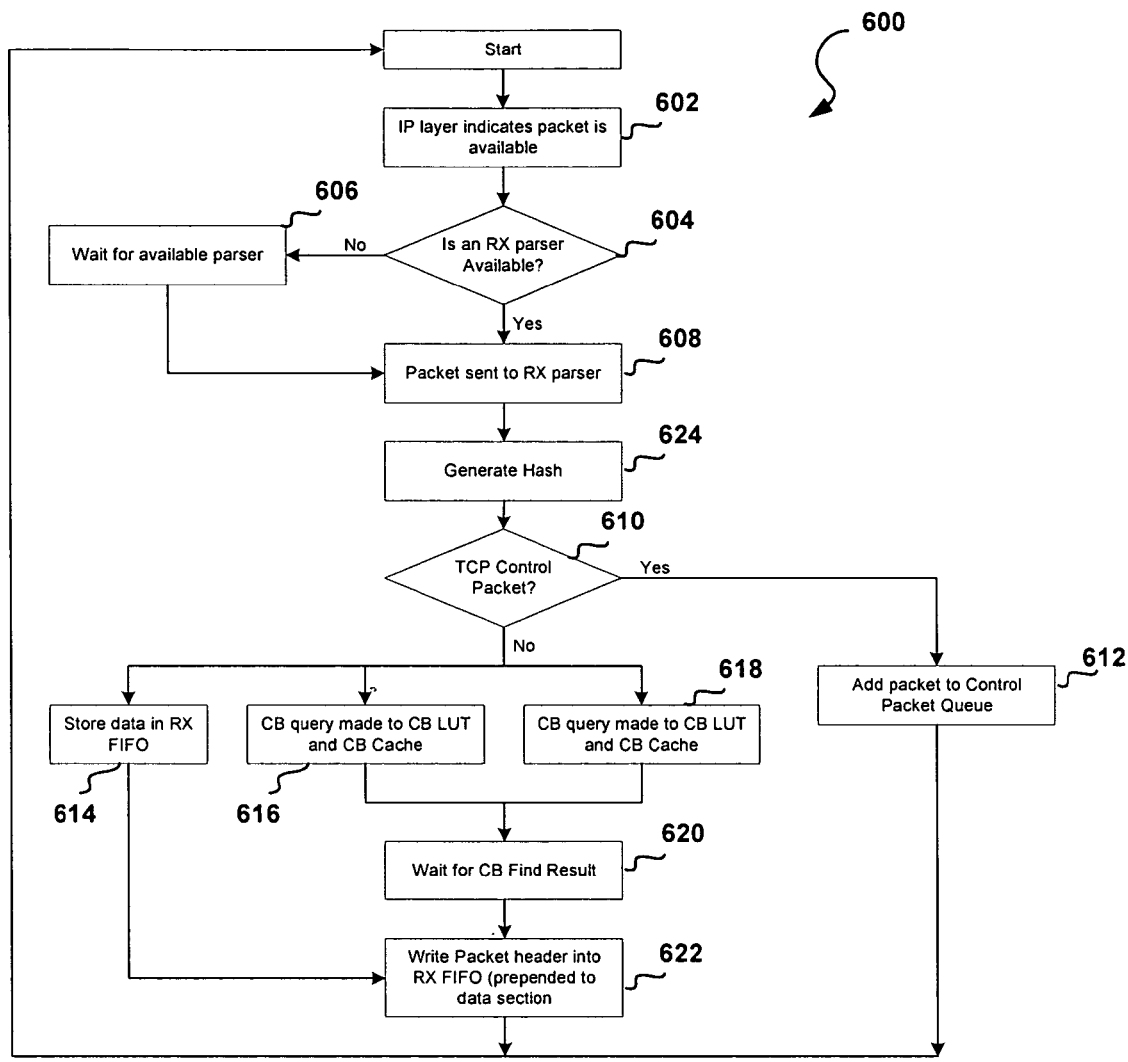
FIG. 6 illustrates an exemplary front-end method for processing received packets, in accordance with one embodiment.

FIG. 6 illustrates an exemplary front-end method 600 for processing received packets, in accordance with one embodiment. As an option, the method 600 may be carried out in the context of the exemplary architecture 200 of FIG. 2, or even the exemplary frameworks of FIGS. 3-5. Of course, however, it should be noted that the method 600 may be implemented in any desired context. Moreover, while various functions may be attributed to exemplary components (i.e. like those set forth hereinabove), it is important to understand that the various functionality may be carried out by any desired entity.

FIG. 6 depicts the processing flow for received packets up to a RX buffer (i.e. see, for example, the RX FIFO buffer 322 of FIG. 3), and thus focuses on front-end processing.

In operation 602, an Internet Protocol (IP) layer indicates whether a received packet is available. In response to such indication, in decision 604, it is determined whether a RX parser (i.e. see, for example, the RX parser 414 of FIG. 4) is available.

If it is determined that a RX parser is not available, the method 600 waits for an available RX parser. Note operation 606. If available, the received packet is sent to the available RX parser in operation 608.

Once an RX parser is available, a hash is generated for the packet based upon parameters contained within the packet headers 624. The RX parser then looks at the TCP header to determine the packet type (see decision 610), and to parse out packet parameters. If the packet is a pure TCP control packet (i.e. the packet contains no TCP data), the packet is sent to a control packet queue (i.e. see, for example, the control packet queue 404 of FIG. 4). See operation 612.

If the packet does contain TCP data, a CB search is started in operations 616 and 618. The search may be done via dual data structures (i.e. see, for example, the CB look-up table 318 and CB data cache 324, etc.) in parallel. Whichever path finishes first ends the search processing. However, if searching the CB data cache fails to find a matching CB entry, the logic waits until the CB look-up table look-up finishes, as indicated in operation 620. In one embodiment, it is never the case where the CB look-up table fails to find the CB, but the CB is found in the CB data cache.

In parallel to finding the CB, the TCP data is stored in a RX buffer (i.e. see, for example, the RX FIFO buffer 322, etc.). Note operation 614. Once all the data has been written, in operation 622, a tag section is prepended to the data section in the RX FIFO. This tag includes parameters for the packet (i.e. what type of data it is), as well as some status information obtained from the CB entry (if one was found). After the tag is written to the RX FIFO, the particular parser is free to accept another received packet.

Figure 7:
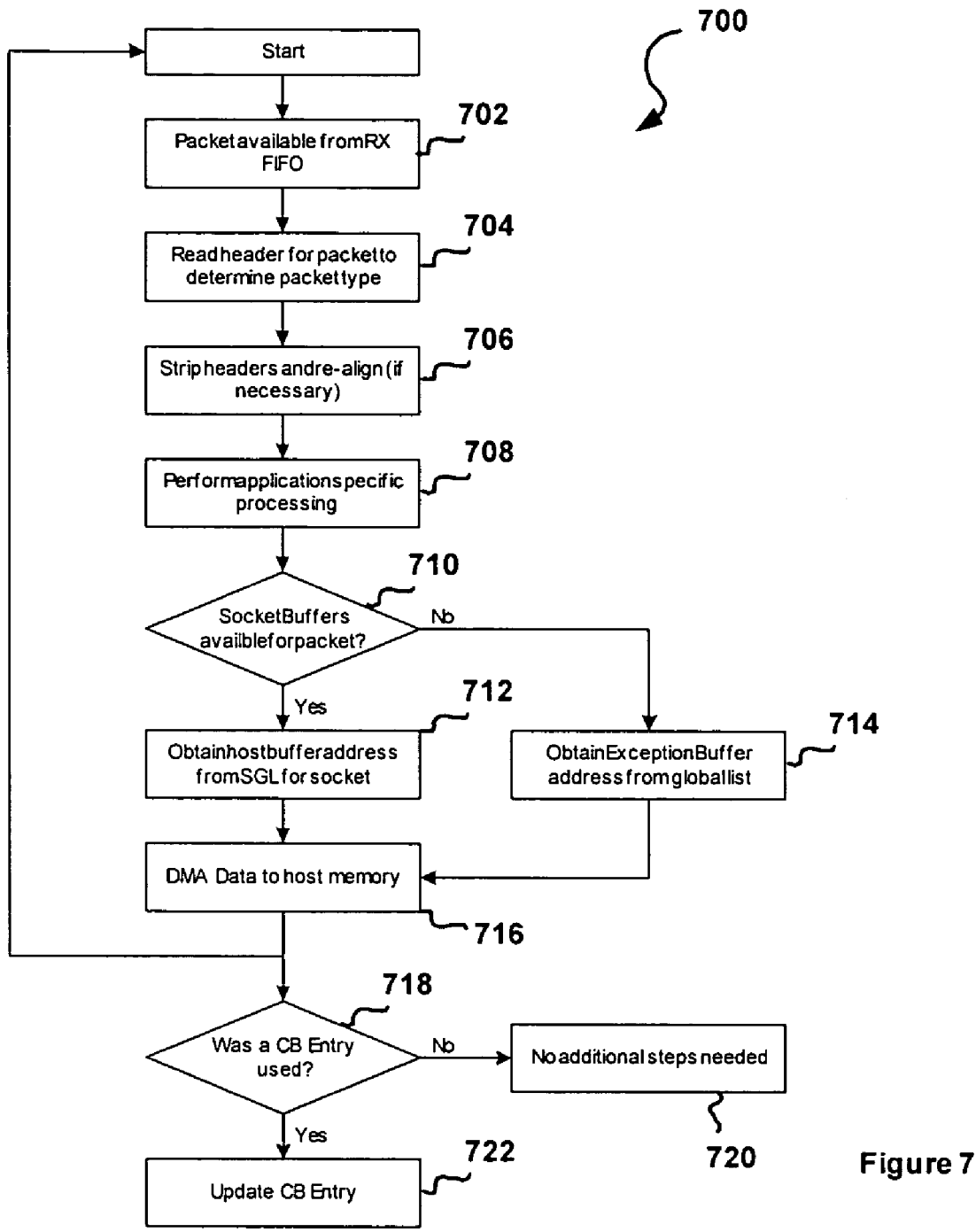
FIG. 7 illustrates an exemplary back-end method for processing received packets, in accordance with one embodiment.

FIG. 7 illustrates an exemplary back-end method 700 for processing received packets, in accordance with one embodiment. As an option, the method 700 may be carried out in the context of the exemplary architecture 200 of FIG. 2, or even the exemplary frameworks of FIGS. 3-5. Still yet, the method 700 may be carried out in conjunction with the front-end method 600 of FIG. 6.

Of course, however, it should be noted that the method 700 may be implemented in any desired context. Moreover, while various functions may be attributed to exemplary components (i.e. like those set forth hereinabove), it is important to understand that the various functionality may be carried out by any desired entity.

FIG. 7 depicts the processing flow for received packets after a RX buffer (i.e. see, for example, the RX FIFO buffer 322 of FIG. 3), and thus focuses on back-end processing.

Flow in FIG. 7 begins when data is available at the output of a RX FIFO buffer (i.e. see, for example, the RX FIFO buffer 322, etc.). Initially, in operations 702 and 704, the header section for the RX FIFO buffer entry is read if the packet is available. This indicates to the back-end logic the type of the data packet, as well as other status information.

After the packet buffer header is parsed, it is stripped along with the Ethernet, IP, and TCP/UDP headers (for packets received on offloaded connections), and the data is re-aligned. See operation 706.

The data is then optionally passed through optional allocation specific processing logic. See operation 708. This logic is where iSCSI and RDMA support processing is performed, for example.

If the packet belongs to an offloaded connection (i.e. a CB entry was found that matched the packet parameters), a check is made to see if any SGL buffers are available for the data. Note decision 710. If there are buffers available, the data is DMA'ed to the socket buffers in processor system memory. This is accomplished by obtaining a host buffer address from an SGL of the socket in operation 712, after which the data is DMA'ed to the processor system memory. See operation 716.

If no socket buffers are available, the data is DMA'ed to general exception buffers (also located in processor system memory) using an exception buffer address from a global list. See operation 714. A notification may then also be sent to the host indicating that there is data for it to process.

If a CB was used for the packet (per decision 718), the CB is updated in operation 722. If not, no additional operation is required (as noted in operation 720). In parallel, the back-end logic may start to process the next packet from the RX FIFO buffer.

Figure 8:
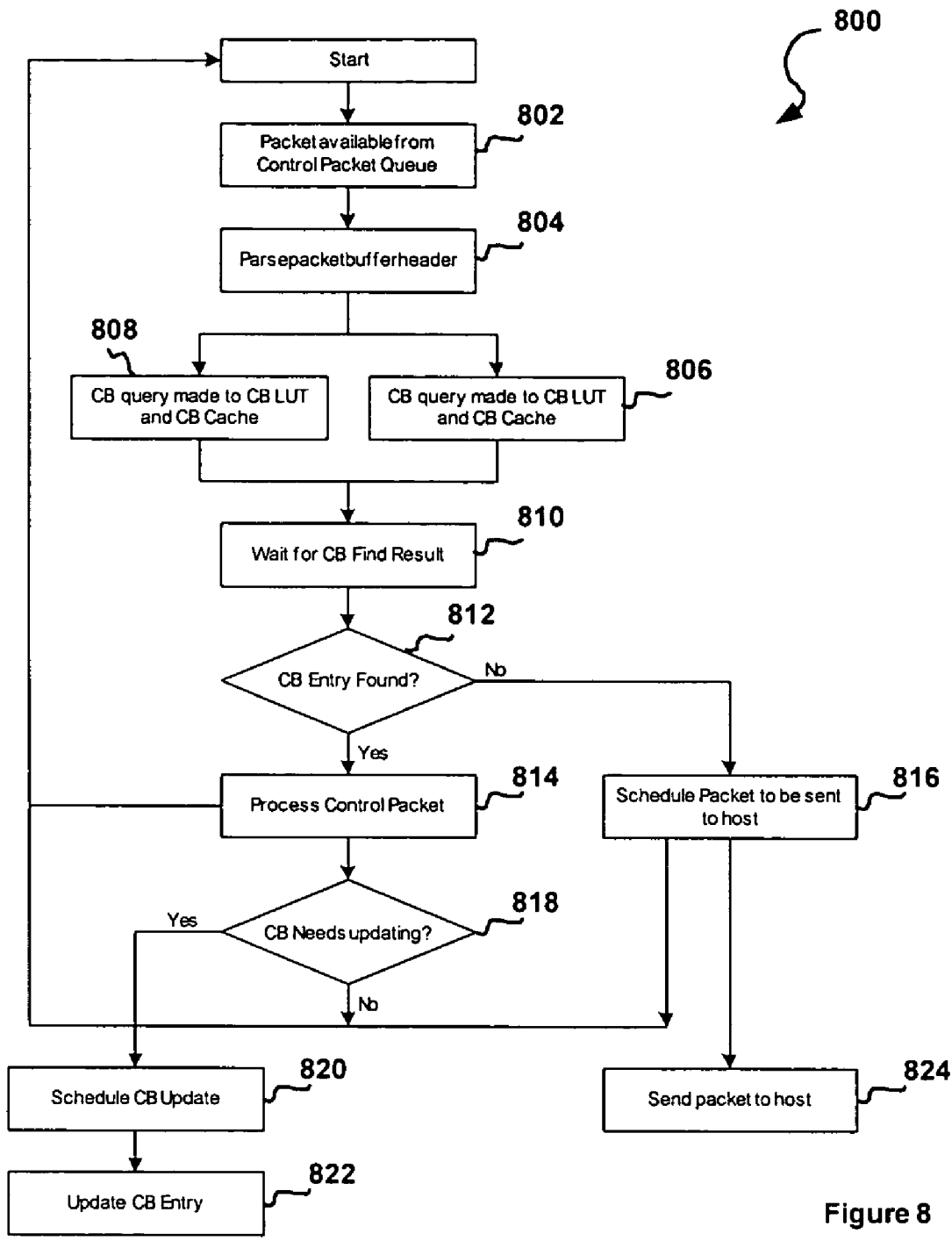
FIG. 8 illustrates an exemplary control packet processing method for processing received control packets, in accordance with one embodiment.

FIG. 8 illustrates an exemplary control packet processing method 800 for processing received packets, in accordance with one embodiment. As an option, the method 800 may be carried out in the context of the exemplary architecture 200 of FIG. 2, or even the exemplary frameworks of FIGS. 3-5. Still yet, the method 800 may be carried out in conjunction with the methods 600 and 700 of FIGS. 6 and 7, respectively.

Of course, however, it should be noted that the method 800 may be implemented in any desired context. Moreover, while various functions may be attributed to exemplary components (i.e. like those set forth hereinabove), it is important to understand that the various functionality may be carried out by any desired entity.

The method 800 of FIG. 8 begins when a control packet is available at the output of a control packet queue (i.e. see, for example, the control packet queue 404 of FIG. 4). Note operation 802. The first thing that is done is that the packet buffer header is parsed. See operation 804. This header contains the generated packet hash, along with other status information associated with the control packet. Next, a search of a matching CB is started using the retrieved hash value. Similar to the method 600 of FIG. 6 used in the front-end logic for data packets, dual data structures (i.e. see, for example, the CB look-up table 318 and CB data cache 324, etc.) are queried in parallel. See operations 806 and 808, followed by a wait for the result in operation 810.

If no CB was found to match the received TCP control packet per decision 812, the packet is scheduled to be sent to the host via DMA in operation 816, the RX control logic can start to process the next control packet from the queue. The logic does not necessarily wait for the control packet to be DMA'ed to the host in operation 824, before continuing.

If a matching CB was found for the control packet per decision 812, the packet is processed in operation 814. A check is then made to see if the socket CB needs updating as a result of the packet processing. See decision 818. If the CB does need updating, the CB is scheduled for an update in operations 820 and 822. The control packet logic can then start processing the next control packet from the queue. In parallel, the CB is updated for the current control packet, as set forth earlier.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing packets received via a network, comprising:

receiving data packets and control packets via a network; and processing the data packets in parallel with the processing of the control packets;

wherein tag information is prepended to the data packets;
wherein the tag information includes a socket handle associated with the corresponding packet;
wherein a receiver (RX) back-end module parses and strips a packet buffer header from one of the data packets once the one of the data packets has been completely buffered;
wherein the one of the data packets is re-aligned after the packet buffer head is parsed and stripped from the one of the data packets.

2. The method as recited in claim 1, wherein the control packets are processed utilizing a first processing path and the data packets are processed utilizing a second processing path separate from the first processing path.

3. The method as recited in claim 1, wherein the processing of the data packets and the control packets includes utilizing, in parallel, a look-up table and a cache in order to identify a correct socket control block associated with the data packets and the control packets.

4. The method as recited in claim 1, wherein the processing of the data packets includes utilizing, in parallel, substantially duplicate logic in order to identify a correct socket control block associated with the packets.

5. The method as recited in claim 4, wherein the correct socket control block associated with the packets includes information used to track a connection attempt or a connection.

6. The method as recited in claim 4, wherein the packets are stored while the correct socket control block associated with the packets is identified, as a result of prepending the tag information to the data packets.

7. The method as recited in claim 1, wherein control blocks associated with the data packets and the control packets are updated in parallel with processing of subsequent data packets and control packets.

8. The method as recited in claim 1, wherein the tag information is prepended to the data packets while buffered in a receiver (RX) first-in-first-out (FIFO) buffer.

9. The method as recited in claim 1, wherein the tag information includes a type of the corresponding packet.

10. The method as recited in claim 1, wherein the tag information includes status information associated with the corresponding packet.

11. The method as recited in claim 1, wherein the tag information includes control information associated with the corresponding packet.

12. The method as recited in claim 1, wherein the data packets are buffered utilizing a receiver (RX) first-in-first-out (FIFO) buffer.

13. The method as recited in claim 1, wherein the processing of the data packets and the control packets includes utilizing a cache during a search mode in order to identify a correct socket control block associated with the data packets and the control packets, where, if the correct socket control block is not in the cache, the correct socket control block is retrieved from a main memory, but not stored in the cache when in the search mode.

14. The method as recited in claim 1, wherein the processing of the data packets includes utilizing, in parallel, substantially duplicate logic and multiple data structures, including a look-up table and a socket control block cache, in order to identify a correct socket control block associated with the packets.

15. The method as recited in claim 14, wherein the correct socket control block associated with the packets is identified by querying a hash association table of the socket control block cache to determine if a matching socket control block hash associated with the packets is present in the socket control block cache.

16. A sub-system, comprising:
an offload engine in communication with a bus for receiving data packets and control packets via a network, and processing the data packets in parallel with the control packets;
wherein the sub-system is operable such that tag information is prepended to the data packets;
wherein the tag information includes a socket handle associated with the corresponding packet;
wherein a receiver (RX) back-end module parses and strips a packet buffer header from one of the data packets once the one of the data packets has been completely buffered;
wherein the sub-system is operable such that the one of the data packets is re-aligned after the packet buffer header is parsed and stripped from the one of the data packets.

17. A system, comprising:
a bus;
a memory in communication with the bus;
a processor in communication with the bus; and
an offload engine in communication with the bus for receiving data packets and control packets via a network, and processing the data packets in parallel with the control packets;
wherein the system is operable such that tag information is prepended to the data packets;
wherein the tag information includes a socket handle associated with the corresponding packet;
wherein a receiver (RX) back-end module parses and strips a packet buffer header from one of the data packets once the one of the data packets has been completely buffered;
wherein the system is operable such that the one of the data packets is re-aligned after the packet buffer header is parsed and stripped from the one of the data packets.

18. The system as recited in claim 17, wherein the system includes a general computer.

19. The system as recited in claim 17, wherein the system includes a game console.

20. The system as recited in claim 17, wherein the processor includes at least one of a central processing unit, a graphics processing unit, and one of a plurality of integrated circuits included in a chipset.

21. The system as recited in claim 17, wherein the system includes a circuit board.

22. A method for processing packets received via a network, comprising:
receiving packets via a network; and
identifying a correct socket control block associated with the packets utilizing, in parallel, a look-up table and a cache in order to accelerate the identification of the correct socket control block;
wherein control blocks associated with the packets are updated in parallel with processing of subsequent packets;
wherein tag information is prepended to the packets;
wherein the tag information includes a socket handle associated with the corresponding packet;
wherein a receiver (RX) back-end module parses and strips a packet buffer header from one of the packets once the one of the packets has been completely buffered;
wherein the one of the packets is re-aligned after the packet buffer header is parsed and stripped from the one of the packets.

23. A method for processing packets received via a network, comprising:
  receiving packets via a network; and
  identifying a correct socket control block associated with the packets utilizing, in parallel, substantially duplicate logic in order to accelerate the identification of the correct socket control block;
  wherein tag information is prepended to the packets;
  wherein the tag information includes a socket handle associated with the corresponding packet;
  wherein a receiver (RX) back-end module parses and strips a packet buffer header from one of the packets once the one of the packets has been completely buffered;
  wherein the one of the packets is re-aligned after the packet buffer header is parsed and stripped from the one of the packets.

24. A method for processing data packets received via a network, comprising:
  receiving data packets via a network; and
  processing the data packets;
  wherein tag information is prepended to the data packets, after the data packets are stored in a receiver (RX) first-in-first-out (FIFO) buffer;
  wherein the tag information includes a socket handle associated with the corresponding packet;
  wherein a receiver (RX) back-end module parses and strips a packet buffer header from one of the data packets once the one of the data packets has been completely buffered;
  wherein the one of the data packets is re-aligned after the packet buffer header is parsed and stripped from the one of the data packets.

25. A method for processing packets received via a network, comprising:
  receiving a first packet via a network;
  processing the first packet via a network;
  updating a control block associated with the first packet; and
  after at least starting the updating of the control block associated with the first packet and before finishing the updating, at least starting the processing of a second packet;
  wherein tag information is prepended to the first packet;
  wherein the tag information includes a socket handle associated with the corresponding packet;
  wherein a receiver (RX) back-end module parses and strips a packet buffer header from the first packet once the first packet has been completely buffered;
  wherein the first packet is re-aligned after the packet buffer header is parsed and stripped from the first packet.

26. A method for processing packets received via a network, comprising:
  processing received packets utilizing a front-end module; and
  processing received packets utilizing a back-end module;
  wherein a receiver (RX) first-in-first-out (FIFO) buffer is coupled between the front-end module and the back-end module for providing a boundary therebetween;
  wherein control blocks associated with the received packets are updated in parallel with processing of subsequent received packets;
  wherein tag information is prepended to the received packets;
  wherein the tag information includes a socket handle associated with the corresponding packet;
  wherein the back-end module parses and strips a packet buffer header from one of the received packets once the one of the received packets has been completely buffered;
  wherein the one of the received packets is re-aligned after the packet buffer header is parsed and stripped from the one of the received packets.

27. A method for processing packets received via a network, comprising:
  receiving data packets and control packets via a network; and
  processing the data packets in parallel with the processing of the control packets;
  wherein the data packets are buffered utilizing a receiver (RX) first-in-first-out (FIFO) buffer;
  wherein a receiver (RX) back-end module parses and strips a packet buffer header from one of the data packets once the one of the data packets has been completely buffered utilizing the receiver (RX) first-in-first-out (FIFO) buffer;
  wherein the one of the data packets is re-aligned after the packet buffer header is parsed and stripped from the one of the data packets.

28. A method for processing packets received via a network, comprising:
  receiving data packets and control packets via a network; and
  processing the data packets in parallel with the processing of the control packets;
  wherein tag information is prepended to the data packets;
  wherein the tag information includes a socket handle associated with the corresponding packet;
  wherein a receiver (RX) back-end module parses and strips a packet buffer header from one of the data packets once the one of the data packets has been completely buffered;
  wherein the processing of the data packets and the control packets includes utilizing a cache during a search mode in order to identify a correct socket control block associated with the data packets and the control packets, where, if the correct socket control block is not in the cache, the correct socket control block is retrieved from a main memory, but not stored in the cache when in the search mode.

29. The method as recited in claim 28, wherein the control packets are processed utilizing a first processing path and the data packets are processed utilizing a second processing path separate from the first processing path.

30. The method as recited in claim 28, wherein the processing of the data packets and the control packets includes utilizing, in parallel, a look-up table and the cache in order to identify the correct socket control block associated with the data packets and the control packets.

31. The method as recited in claim 28, wherein the processing of the data packets includes utilizing, in parallel, substantially duplicate logic in order to identify the correct socket control block associated with the packets.

32. The method as recited in claim 28, wherein control blocks associated with the data packets and the control packets are updated in parallel with processing of subsequent data packets and control packets, 33. The method as recited in claim 28, wherein the tag information is prepended to the data packets while buffered in a receiver (RX) first-in-first-out (FIFO) buffer.

34. The method as recited in claim 28, wherein the tag information includes a type of the corresponding packet.

35. The method as recited in claim 28, wherein the tag information includes status information associated with the corresponding packet.

36. The method as recited in claim 28, wherein the tag information includes control information associated with the corresponding packet.

37. The method as recited in claim 28, wherein the data packets are buffered utilizing a receiver (RX) first-in-first-out (FIFO) buffer.

38. A sub-system, comprising:
   an offload engine in communication with a bus for receiving data packets and control packets via a network, and processing the data packets in parallel with the control packets;
   wherein the sub-system is operable such that tag information is prepended to the data packets;
   wherein the tag information includes a socket handle associated with the corresponding packet;
   wherein a receiver (RX) back-end module parses and strips a packet buffer header from one of the data packets once the one of the data packets has been completely buffered;
   wherein the offload engine is operable such that the processing of the data packets and the control packets includes utilizing a cache during a search mode in order to identify a correct socket control block associated with the data packets and the control packets, where, if the correct socket control block is not in the cache, the correct socket control block is retrieved from a main memory, but not stored in the cache when in the search mode.

39. A system, comprising:
   a bus;
   a memory in communication with the bus;
   a processor in communication with the bus; and
   an offload engine in communication with the bus for receiving data packets and control packets via a network, and processing the data packets in parallel with the control packets;
   wherein the system is operable such that tag information is prepended to the data packets;
   wherein the tag information includes a socket handle associated with the corresponding packet;
   wherein a receiver (RX) back-end module parses and strips a packet buffer header from one of the data packets once the one of the data packets has been completely buffered;
   wherein the offload engine is operable such that the processing of the data packets and the control packets includes utilizing a cache during a search mode in order to identify a correct socket control block associated with the data packets and the control control block is retrieved from a main memory, but not stored in the cache when in the search mode.

40. The system as recited in claim 39, wherein the system includes a general computer.

41. The system as recited in claim 39, wherein the system includes a game console.

42. The system as recited in claim 39, wherein the processor includes at least one of a central processing unit, a graphics processing unit, and one of a plurality of integrated circuits included in a chipset.

43. The system as recited in claim 39, wherein the system includes a circuit board.

* * * * *

UNITED STATES PATENT AND TRADEMARK OFFICE
CERTIFICATE OF CORRECTION

PATENT NO.        : 7,957,379 B2
APPLICATION NO.   : 10/969376
DATED             : June 7, 2011
INVENTOR(S)       : Minami et al.

Page 1 of 1

It is certified that error appears in the above-identified patent and that said Letters Patent is hereby corrected as shown below:

On the cover:
  Inventors (75), please replace "Robia Y. Uyeshiro" with --Robin Y. Uyeshiro--.

In the claims:
  Col. 13, line 9, please replace "head" with --header--;
  Col. 16, line 61, please replace "packets," with --packets.--;
  Col. 18, line 19, please replace "control control" with --control packets, where, if the correct socket control block is not in the cache, the correct socket control--.

Signed and Sealed this
Twenty-third Day of August, 2011

David J. Kappos
*Director of the United States Patent and Trademark Office*